United States Patent [19]
Shou et al.

[11] Patent Number: 5,910,948
[45] Date of Patent: Jun. 8, 1999

[54] ACQUISITION SCHEME AND RECEIVER FOR AN ASYNCHRONOUS DS-CDMA CELLULAR COMMUNICATION SYSTEM

[75] Inventors: Guoliang Shou; Changming Zhou; Xuping Zhou; Makoto Yamamoto; Sunao Takatori, all of Tokyo; Mamoru Sawahashi; Fumiyuki Adachi, both of Yokohama, all of Japan

[73] Assignees: NTT Mobile Communications Network, Inc.; YOZAN Inc., both of Tokyo, Japan

[21] Appl. No.: 08/955,613

[22] Filed: Oct. 22, 1997

[30] Foreign Application Priority Data

Oct. 23, 1996 [JP] Japan ................................. 8-297859

[51] Int. Cl.[6] ................................................ H04B 7/216
[52] U.S. Cl. ......................... 370/335; 370/331; 375/206
[58] Field of Search .................................. 370/320, 328, 370/331, 335, 441, 442, 350; 375/200, 206, 207, 208, 209, 210; 455/422, 436, 437, 438, 439

[56] References Cited

U.S. PATENT DOCUMENTS

| | | | |
|---|---|---|---|
| 5,179,571 | 1/1993 | Schilling et al. | 370/331 |
| 5,345,467 | 9/1994 | Lomp et al. | 370/331 |
| 5,592,506 | 1/1997 | Omura et al. | 375/207 |
| 5,717,713 | 2/1998 | Natali | 375/200 |

*Primary Examiner*—Ajit Patel
*Assistant Examiner*—Bob A. Phunkulh
*Attorney, Agent, or Firm*—Pillsbury Madison & Sutro LLP

[57] ABSTRACT

The present invention realizes a rapid and efficient cell search and small-size instrument for an asynchronous DS-CDMA cellular system. This cell search detects the correlation between the received signal and the short code of the control channel, and matched filter 22 detects the maximum electric power correlation peak location. Next, using correlators 28-1 to 28-n which are parallelly set in a plurality for RAKE processing with plurality, identifies the long code that is set in the system with the detected long code timing. After the long code is synchronized, a multipath signal is received using 28-1 to 28-n, and the data is judged by RAKE processing. When peripheral cell search is executed, after long code timing is detected by using matched filter 22, the long code of the candidate peripheral cell is designated using the same matched filter. Handover is safely realized by receiving the signal from the connected base station by correlators 28-1 to 28-n, and the base station signal through handover by 22.

7 Claims, 8 Drawing Sheets

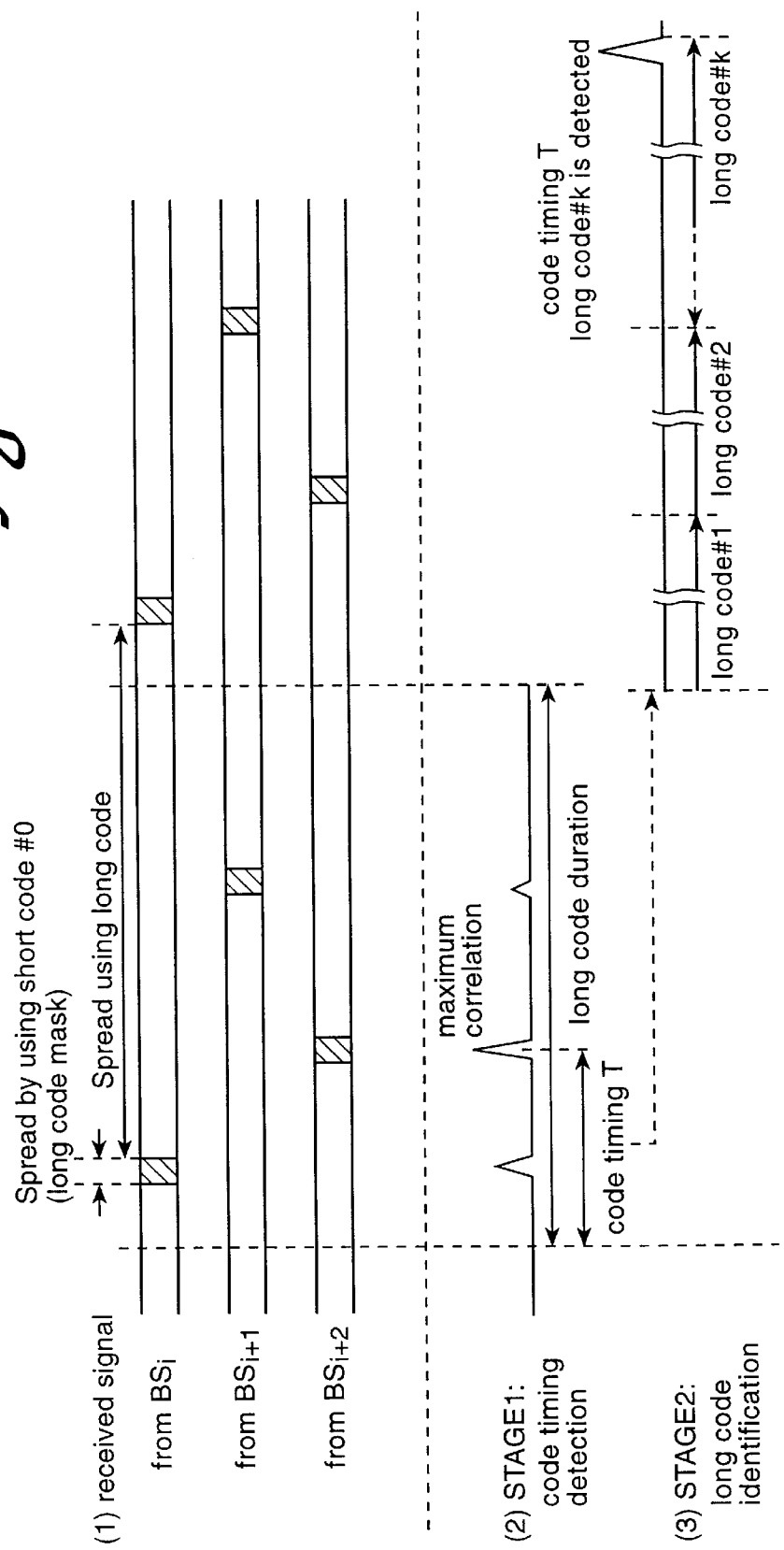

ACQUISITION SCHEME AND RECEIVER FOR AN ASYNCHRONOUS DS-CDMA CELLULAR COMMUNICATION SYSTEM

FIELD OF THE INVENTION

The present invention relates to a Direct Sequence-Code Division Multiple Access (DS-CDMA) acquisition scheme and a receiver for it.

BACKGROUND OF THE INVENTION

With the development of mobile land communications, the CDMA cellular system gains importance through its use of direct sequence (DS) spread spectrum (SS), which greatly increases channel capacity. But the interference common in CDMA systems decreases their frequency efficiency with respect to other multiple access systems like Frequency Division Multiple Access (FDMA) and Time Division Multiple Access (TDMA). Nevertheless, in the cellular method, CDMA can utilize its characteristics of high efficiency for cell-repeat and durability against interference because the frequency reuse efficiency in space (cell repeating ratio of a frequency) contributes to the overall frequency use efficiency.

In the usual cellular system, two cell searches are necessary: for acquiring a cell connected to a mobile station (hereinafter an initial cell search) and for searching for a peripheral cell on handovers (hereinafter a peripheral cell search). Especially in the DS-CDMA cellular system, since each cell uses an identical frequency, it is necessary to acquire a timing error within a half-chip cycle, which is between the spread code of a received signal and the spread code replica generated in the receiver.

DS-CDMA cellular systems are classified into a synchronous system for strict time acquisition and an asynchronous system without it. The synchronous system realizes acquisition using another system such as the global positioning system (GPS). As an identical long code gives each station a different delay, the initial cell search can be executed only by performing timing acquisition of the long code. The peripheral cell search on handovers can be carried out more rapidly because the peripheral station code delay information is sent from the base station to which the mobile station belongs.

In the asynchronous system, however, each base station has a different and distinct spread code, and the mobile station needs to designate that code in the initial cell search. In the peripheral cell search on handovers, the number of spread codes for designation can be limited by obtaining the spread code information used in the base station to which it belongs and its peripheral base stations. In both cases, the search time exceeds that of the synchronous system above, and when a long code is used as the spread code, this search time is huge. However, the merit of the asynchronous system is that it requires no other system such as GPS.

A cell search is proposed so as to solve the problem of the asynchronous system and performs rapid acquisition in "Two-Stage Rapid Long code Acquisition Scheme in DS-CDMA Asynchronous Cellular System", TECHNICAL REPORT OF IEICE, CS-96-19, RCS96-12 (1996-05). The proposed acquisition scheme detects a long code timing by despreading the short code common to each cell using a matched filter first, and each cell's own long code is designated by a matched filter or a sliding correlator.

The proposed acquisition is described hereinafter. FIG. 8 shows the cell structure. As shown, each cell has a base station like BS1, BS2, . . . BSN, each of which transmits information to and receives it from mobile station 100 by doubly despread symbols using long codes #1 to #N and channel-distinguishing short codes #0 to #M. Short codes #0 to #M are common to every cell, and short code #0 is adopted to the control channel of each cell.

FIG. 9 shows the two-stage rapid acquisition above. FIG. 9 (1) shows examples of signals received by the mobile station. They are the received signals of control channels transmitted from base stations $BS_i$, $BS_{i+1}$, $BS_{i+2}$. As shown, each control channel has a symbol (the part with diagonal lines) which is spread only by short code #0, the control channel common to each base station, by one long code cycle. This is realized by not performing long code despreading in the predetermined cycle. Other symbol locations are double despread by long code #i which is different from that of each base station and short code #0 above. Such double despreading makes it possible to demodulate the control code even when mobile stations synchronously receive the timing of long codes between cells. The control channels transmitted from each base station $BS_i$ to $BS_{i+2}$ are asynchronously multiplied and received by the mobile station.

In a mobile station, the cell search is carried out with the two-stage structure described here. FIG. 9 (2) shows the first-stage performance: in a mobile station, the correlation between the received signal and the control channel short code replica "short code #0" is detected by a matched filter. As stated, each control channel has a symbol (with diagonal lines) spread in a long code cycle by short code #0 which is common to each base station. Therefore, when the correlation is detected during a single code cycle using the short code symbol replica, the correlation peaks are detected at the locations corresponding to the spread symbol receiving timings of short code #0. At the mobile station, (1) the timing detected at the largest correlation peak is recognized as the control channel long code synchronous timing of the base station which requests connection, then, (2) the long code which is spreading the control channel that detected the long code synchronous timing is designated using a single sliding correlator in order to distinguish the station. To execute it, at the initial cell search, a) long code #i is sequentially selected among the group of long codes #1 to #N decided in the system, b) the replica symbol of the selected long code #i+short code #0 is generated, and c) the correlation of synchronous timing obtained in (1) is detected. To execute the peripheral cell search on handovers, a) the replica symbol of the selected long code #i+short code #0 is generated in the group of long codes of peripheral cells informed from the base station presently connected, similar to the above, and b) the correlation is detected with respect to the synchronous timing. The correlation is thus detected by changing long code #i until the correlation detecting value exceeds the threshold value, then long code #k exceeding the threshold value is judged as the long code of the receiving control channel: this is the completion of the cell search. The base station can then be designated.

The cell search can be rapidly performed by dividing the long code timing synchronization and long code designation. In the normal asynchronous cellular system, (number of spread codes×number of spread code phases) times correlation detection is needed; on the other hand, in the proposed scheme, the correlation detection is approximately only (number of spread codes+number of spread code phases) times.

SUMMARY OF THE INVENTION

Though the cell search can be executed at high speed by this two-stage rapid acquisition scheme, the demand is for even more rapid acquisition.

The present invention has an object to provide an acquisition scheme and a receiver for an asynchronous DS-CDMA cellular system able to carry out cell searches more rapidly in asynchronous CDMA communication systems.

Also, it has an object to provide a receiver for an asynchronous DS-CDMA cellular system able to receive signals with good quality even when multipath phasing is generated.

To achieve the above object, the present invention provides an acquisition scheme for an asynchronous DS-CDMA cellular communication system that uses spread code sequences having a long code peculiar to each cell and a short code corresponding to each communication channel, and a control channel among the communication channels employing a specified short code common to each cell. (a) The steps for accomplishing the initial cell search are: (1) detecting the correlation between the specified short code and a received signal, and detecting the long code timing of the relevant base station according to the maximal value of the correlated outputs, and (2) identifying the long code of the base station through parallel detection of the long code used in the relevant system, by using a plurality of parallel correlators, or by using both the plurality of correlators and the matched filter according to the detected long code timing. Additionally, (b) the steps for accomplishing the peripheral cell search are: (1) detecting the a correlation between the specified short code and the received signal, and detecting the long code timing of the relevant base station according to the correlated outputs, and (2) identifying the long code of the base station through handover by sequentially detecting the correlation with the long code corresponding to the peripheral cell using the matched filter while communication is continued with the present cell by employing a plurality of parallel correlators according to the detected long code timing, or by sequentially detecting the correlation with the long code corresponding to the peripheral cell using the plurality of correlators while communication is continued with the present cell by employing the matched filter.

Further, a receiver for an asynchronous DS-CDMA cellular communication system in this invention uses spread code sequences having a long code peculiar to each cell and a short code corresponding to each communication channel, and employing a specified short code common to each cell is in the receiver's control channel, which comprises: i) a matched filter for detecting the correlation between a received signal and a spread code sequence; ii) a plurality of correlators parallelly set for detecting the correlation between the received signal and spread code sequence; iii) a long code timing detector for detecting the maximal correlated output of the matched filter; iv) a long code synchronization judging means for receiving the correlated output from the matched filter; v) a long code synchronization judging means for receiving the correlated output from the plurality of correlators; vi) a correlator controller for receiving the output of the long code timing detecting means and for controlling the actions of the plurality of correlators; and vii) a spread code controller for receiving the output from the long code synchronization judging means, and for outputting control signals to select a spread code sequence used for correlating the action in the matched filter and the plurality of correlators.

Also, a receiver for the asynchronous DS-CDMA cellular communication system described above has its plurality of correlators further contains a delay-locked loop for performing acquisition of a received spread spectrum signal, the correlator controller controls the action of the plurality of correlators according to the peak location of the correlated output from the matched filter, and the data output from the plurality of correlators and from the matched filter are sent to RAKE processing.

Besides, in the receiver, after a long code synchronization, a traffic channel signal is received using the matched filter and the plurality of correlators, and data of multipath signal data are judged through RAKE processing.

Further, in the receiver, after a long code synchronization, a traffic channel signal from the base station of the present cell is received using the matched filter and some correlators among the plurality of correlators, RAKE processing is performed, a control channel signal from the base station of a peripheral cell is received using the remaining correlators, the long code of the cell is recognized and synchronized, a data signal the same as that from the base station of the present cell is received, and signals from both base stations or a plurality of base stations are judged.

Moreover, in the receiver, a multipath signal contained in the matched filter undergoes RAKE processing so as to communicate with the base station of the present cell using the matched filter, and the long code is divided into the length of the short code so as to detect the long code corresponding to the present cell or the peripheral cell by the matched filter, and correlations are sequentially detected by every symbol.

Additionally, in the receiver, the matched filter comprises a plurality of multiplication circuits for outputting the output of a plurality of sampling and holding circuits to the first and second output terminals according to the bit value corresponding to the spread code sequence, a first analog addition circuit for adding the output of the first output terminal of each multiplication circuit, a second analog addition circuit for adding the output of the second output terminal of each multiplication circuit, and a third analog addition circuit for calculating the difference between the outputs of the first and second analog addition circuits.

A remarkably rapid initial cell search can be executed since the long code timing detection is performed by a matched filter and the long code is parallelly designated by a plurality of correlators.

Handovers can be realized during peripheral cell search because matched filter execute this search and the plurality of correlators communicate with the base station. Since the plurality of correlators are used for receiving multipath phasing during communication, and a common device is used for initial cell search, handovers and on-call, higher efficiency and smaller sizes are feasible.

Receiving signals with a RAKE system with a plurality of correlators ensures the receptions of quality signals even when there is multipath phasing.

Using a matched filter that incorporates a sampling and holding circuit, a multiplication circuit and an analog adder decreases electric power consumption.

BRIEF DESCRIPTION OF THE DRAWINGS

FIG. 9 shows a timing chart of the actions for the cell search in the conventional DS-CDMA asynchronous cellular system.

PREFERRED EMBODIMENT OF THE PRESENT INVENTION

Figure 1:
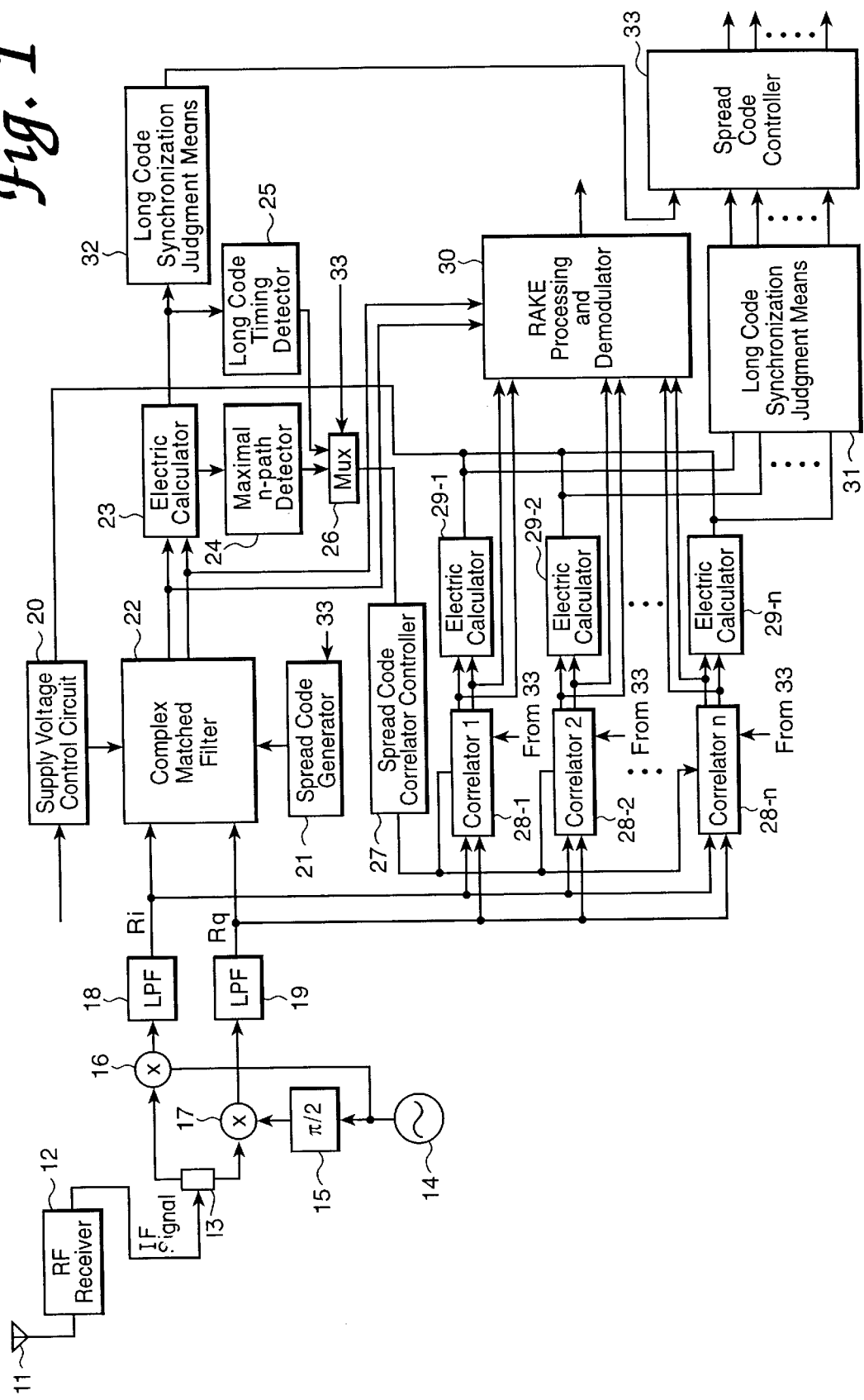
FIG. 1 shows a block diagram of an embodiment of a receiver implementing the initial acquisition scheme of the present invention.

FIG. 1 shows a block diagram of an embodiment of an asynchronous DS-CDMA cellular system according to the present invention. In this embodiment, it is supposed that the spread modulated signal sent from a base station transmitter (not shown) is modulated into Phase Shift Keying (PSK), and I and Q channels are modulated into Binary PSK (BPSK) by spread code sequence.

In FIG. 1, 11 shows an antenna for receiving spread spectrum signals from this base station, 12 shows a high-frequency receiver for transforming spread spectrum signals from 11 into medium-frequency signals, 13 shows a distributor for distributing the medium-frequency signals from 12 into two multiplication circuits, 14 shows an oscillator for generating medium-frequency signal (cos $\omega_c t$), 15 shows a phase-shift circuit for shifting the phase of the oscillating signal of 14 by $\pi/2$, 16 shows a multiplication circuit for multiplying the outputs of 13 and 14, and 17 shows a multiplication circuit for multiplying the output of 13 and that of 15 (sin $\omega_c t$). Portion 18 shows a Low-Pass Filter (LPF) for receiving the multiplication result from 16, from which in-phase component base-band signal Ri is output. Portion 19 shows an LPF for receiving the multiplication result from 17, from which quadrature-phase component baseband signal Rq is output.

Portion 22 shows a complex matched filter in which two matched filters are set for in-phase components and for quadrature components, to which the outputs from LPFs 18 and 19 are input. Portion 21 shows a spread code generator. The spread code generated by 21 is input to 22, and the correlation between Ri and Rq is calculated. The matched filter adopted in 22 can be one using a Charge Coupled Device (CCD), Surface Acoustic Wave (SAW) filter or one made by digital IC circuit. It can also adopt a matched filter structured by an analog operation circuit with low electric power consumption, described later.

Portion 20 shows a power source control circuit for controlling the supply voltage to 22: it drives 22 for the time it takes to detect the peak on the wait-mode with the predetermined time interval. In the present receiver, although a matched filter with large electric power consumption is used for acquisition, the overall power consumption is lowered because the action is intermittently performed.

Portion 23 shows an electric calculator for detecting the magnetude of correlated output sent from 22, and 24 shows a path-detector for detecting each path transmission delay time of received frequency from the output of 23. In this embodiment, a maximum of n number of paths can be detected. Portion 25 shows a long-code timing detector for receiving the output of 23 and detecting the location of the maximal correlation peak, and 32 shows a long code synchronization judgment means for judging whether the correlation peak output from 23 exceeds the predetermined threshold or not. Portion 26 shows a selecting circuit for selecting the output either of 24 or 25, and for outputting it to correlator controller 27.

Correlator controller means 27 supplies baseband signals Ri and Rq and supplies voltage to the predetermined number of correlators in 28-1 to 28-n according to the output of 24 or 25. Either of these is input from 26 so as to start the correlators functioning as well as control the kind and phase of the spread code sequence generated by the spread code generator set in each correlator.

When the long code is acquired, the output of 25 is selected in 26, and the spread code sequence is set in 28-1 to 28-n to correspond to the long code of each cell according to the long code timing. Then, 28-1 to 28-n despread an input signal corresponding to this long code timing.

Input signals Ri and Rq from LPFs 18 and 19 are input to parallel n number of each correlator 28-1 to 28-n, all of which perform despreading. The detailed structure of 28-1 to 28-n is described later. The I- and Q-component demodulation data output from 28-1 to 28-n are input to RAKE processing and demodulating means 30, and input as well to each electric calculator 29-1 to 29-n, in each of which the received electric power corresponding to each path is calculated. The calculation result is next input to long code synchronous judgment means 31, as well as to 20.

When a long code is acquired and a traffic data signal received, the output of 24 is selected in 26, the spread code sequence phase used for despreading in 28-1 to 28-n is controlled according to the delay time information of each path detected in 24 with n number as the maximum, and each correlator 28-1 to 28-n parallelly despreads the signal received by the corresponding path.

The despread data corresponding to each path 28-1 to 28-n is processed using a weight coefficient decided in 30 according to the output from 22, and demodulated into serial data.

In long code synchronization judgment means 31, the correlated outputs from 29-1 to 29-n are judged if they exceed the predetermined threshold, and the evaluated result is input to spread code control means 33.

The output of long code synchronization judgment means 32 is also input to 33. The long code is designated according to the output of each long code acquisition means, and then corresponding to this, the control signals for designating the spread code sequence generated in spread code generators in 21 and 28-1 to 28-n are output to each spread code generator.

Figure 2:
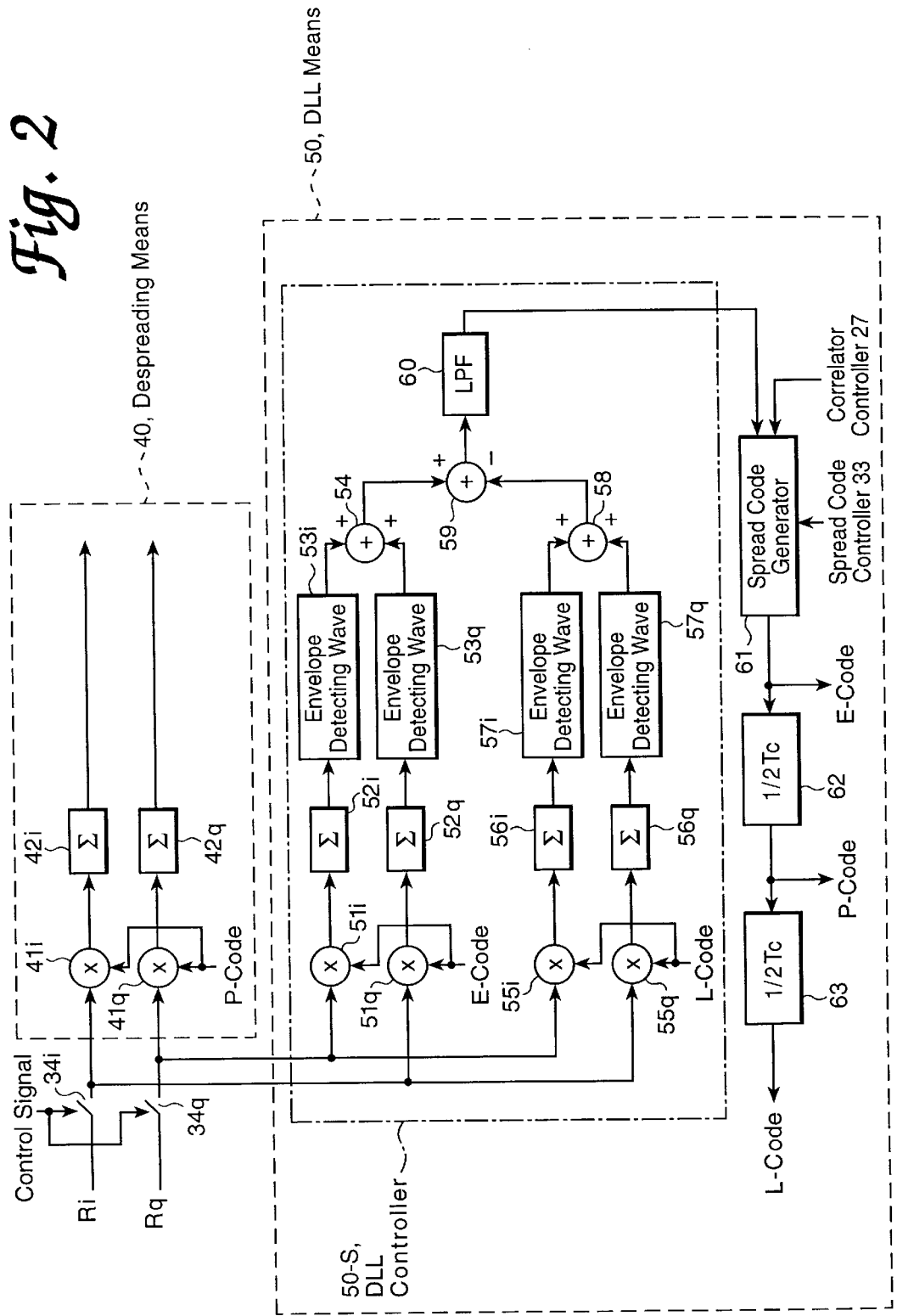
FIG. 2 shows a block diagram of the embodiment structure of a correlator in the receiver in FIG. 1.

FIG. 2 shows an exemplary block diagram of each correlator 28-1 to 28-n. As shown, each correlator includes switches 34i and 34q for controlling the supply of input signals Ri and Rq, along with despreading means 40 and Delay Locked Loop (DLL) means 50. Switches 34i and 34q have their conduction controlled by the output of correlator controller 27.

In 50, 61 is a spread code generator which has the phase designated by 27 and generates the spread code sequence corresponding to the control signal received from spread code controller 33. The spread code sequence output from 61 is input to 51i and 51q (described later) as E-Code (Early Code with the phase advanced by ½ tip cycle (Tc/2) over that of P-code). Portion 62 is a delay circuit for delaying the spread code sequence E-Code by ½ tip cycle (Tc/2) generated by 61. The spread code sequence output from 62 is sent to multiplication circuits 41i and 41q (described later) as P-Code (Punctual Code with the right phase) for despreading. Portion 63 is also a delay circuit for delaying the spread code sequence ½ tip cycle (Tc/2) like 62. The spread code sequence output from 63 is input to multiplication circuits 55i and 55q (described later) as L-Code (Late Code with the phase delayed Tc/2).

In 40, 41i and 41q there are multiplication circuits for multiplying P-Codes to Ri and Rq, which are input through 34i and 34q, respectively. Portions 42i and 42q are accumulators for adding multiplication result signals from 41i and 41q during one cycle of short code. The received signals are despread, and the transmitted data is demodulated by 41i, 41q, 42i and 42q.

Portions 51i and 51q are multiplication circuits for multiplying E-Codes to Ri and Rq, respectively, 52i and 52q are accumulators for accumulating outputs from 51i and 51q during one cycle of short code. The correlation values between received signals Ri and Rq, and E-Code are calculated by 51i, 51q, 52i and 52q. The correlated outputs from 52i and 52q are input to envelope-detecting circuits 53i and 53q, respectively, to delete the influence of modulation, and then added in adder 54.

L-Code is multiplied to Ri and Rq in 55i and 55q, respectively, and the multiplication results are accumulated in accumulators 56i and 56q during one cycle of short code. This action calculates correlations between L-Code and Ri and between L-Code and Rq. The outputs of 56i and 56q have their modulation influence deleted through 57i and 57q, and added in addition circuit 58.

The output of 58 is subtracted from the output of 54 in addition circuit 59, whose output is sent to 61 through low-pass filter 60, thus controlling the phase of spread code generated by 61.

According to it, the output of 59 is positive signal when the actual signal phase advances beyond that of P-Code, and it is negative signal when the actual signal phase delays. When the phases are completely synchronized, the output of 59 is zero. Therefore, the system's output can be stably controlled at zero by setting the spread code phase sequence generated by 61 to delay when the output of 59 is positive, and to advance when it is negative, through feeding it back to 61. The P-Code used in the actual despreading can be tracked in a state synchronized with the received signal.

The controller for this tracking loop ("DLL Control Means 50-S", shown by alternate long and short dashes in FIG. 2) is managed not to work when a long code is synchronized.

When the circuit in FIG. 2 executes acquisition, the phase difference between the spread code sequence of the received signal and that of the receiver must be +−Tc/2. The present invention achieves acquisition with this accuracy by its complex matched filter.

The phase difference between E-Code and L-Code is not limited to Tc as in this embodiment: 2Tc is also possible. When 2Tc is adopted, the accuracy of the acquisition circuit using matched filter 22 can be the corresponding value +−Tc.

Figure 3B:
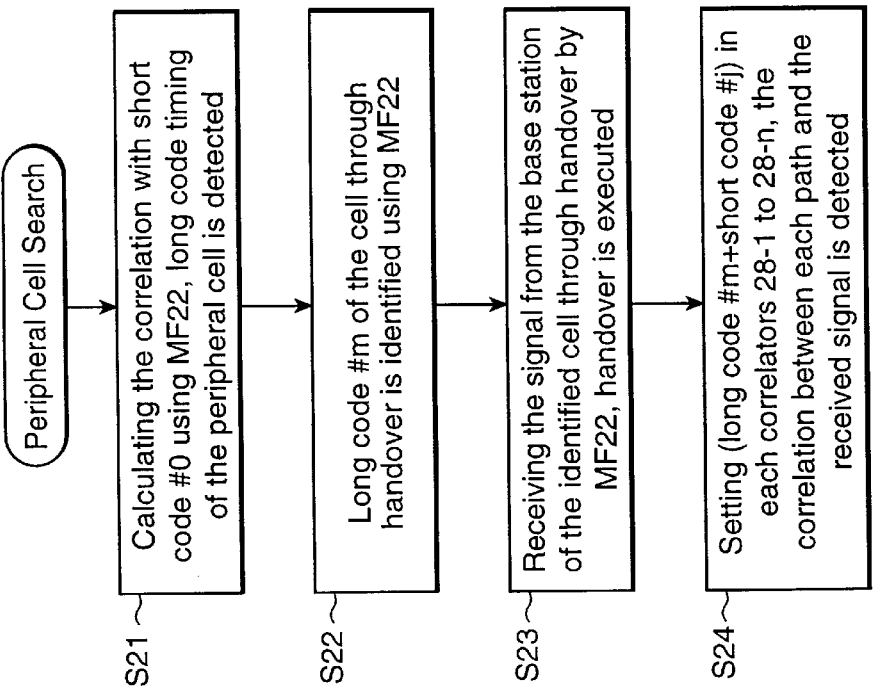
FIGS. 3(a) & 3(b) show a flow-chart of the actions for the cell search of the present invention.
Figure 3A:
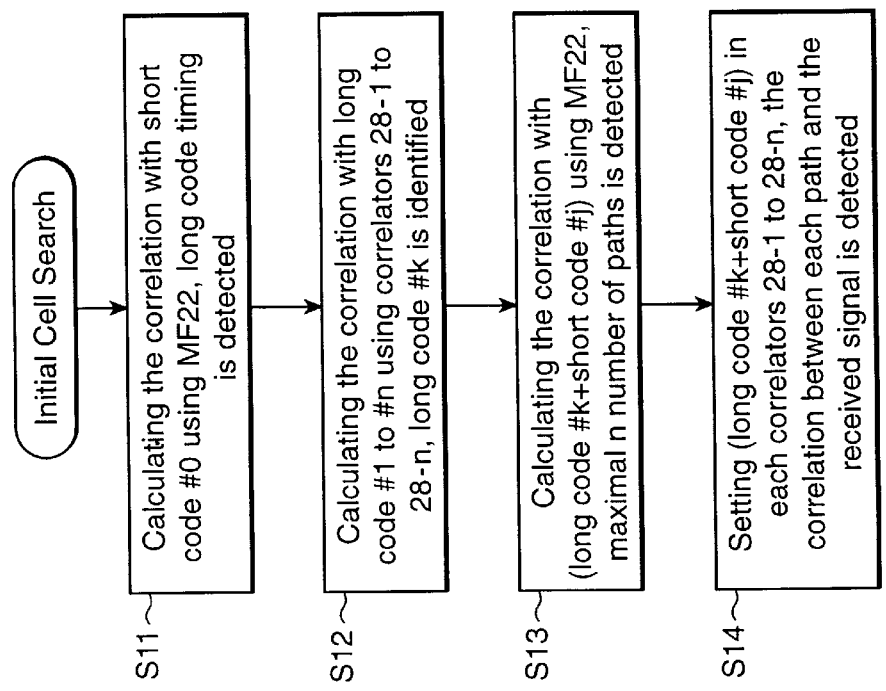
Figure 4:
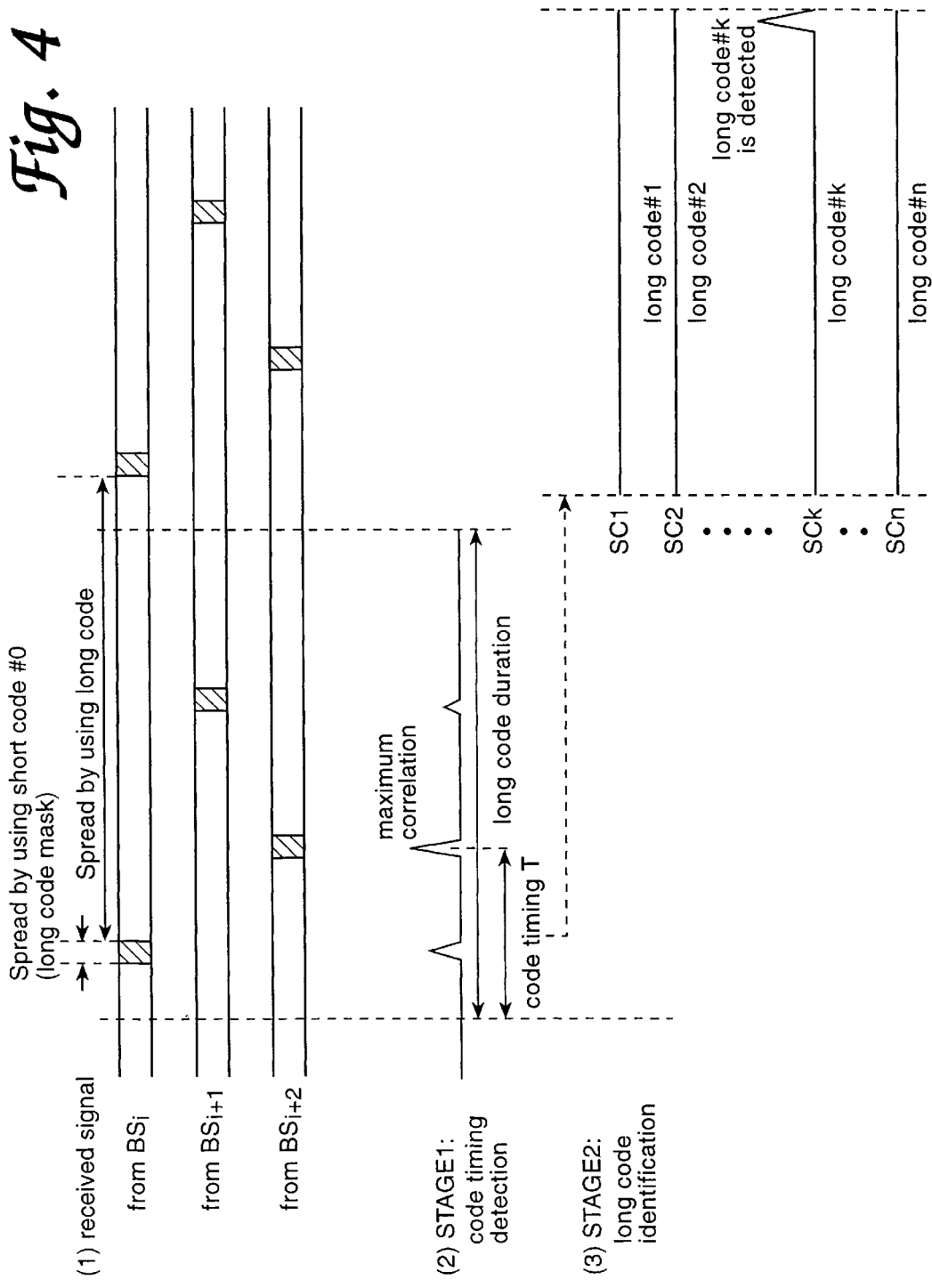
FIG. 4 shows a timing chart of the actions for the cell search of the present invention.

The acquisition scheme of the present invention performed by the CDMA with the above configuration is explained with reference to the flow-charts in FIG. 3 and the timing charts in FIG. 4. FIG. 3 (a) shows the actions of the initial cell search, and FIG. 3 (b) shows the actions of the peripheral cell search. FIG. 4 (1) shows an exemplary spread spectrum signal received by antenna 11, in which only the received signal of the control channel is shown. FIG. 4 (2) shows long code timing detection, and FIG. 4 (3) shows long code identification.

(Initial Cell Search)

When the initial cell search starts, as shown in S11 in FIG. 3 (a), spread code controller 33 generates short code #0 to input to spread code generator 21, the correlation between the received spectrum spread signal and short code #0 is calculated in complex matched filter 22, and the long code timing is detected in long code timing detector 25 according to the output of 22.

That is, as shown in FIG. 4 (1), similar to the case described with respect to FIG. 9, each base station $BS_i$ to $BS_{i+2}$ transmits the signal which is spread by short code #0 employed by the control channel in the predetermined term of the long code cycle (single symbol term, for example), and which is spread by the base station's original long code #i+short code #0 of the rest of the term as the control channel. Antenna 11 receives the processed signals.

In 21, short code #0 is generated by the instruction of 33, and in 22, the correlation between short code #0 and the received signal is calculated during a single long code cycle. The correlated output is input to long code timing detector 25 through electric calculator 23. The output of 23 is a waveform which generates a peak while it is spread only by short code #0 of the control channel signal from each base station, as shown in FIG. 4 (2). In the waveform, the location of the peak with the maximum electricity is judged as the long code timing of the base station of the cell to which the mobile object belongs. In this example, as shown, the received signal level from base station $BS_{i+2}$, and the correlation peak of the received signal are both maximum. Therefore, 25 detects this timing as long code timing T.

The processing step goes forward to S12, at which 1) supply voltage and baseband signals Ri and Rq are given to n number of correlators 28-1 to 28-n; 2) the correlation between the received signal and each long code #1 to #N is calculated using 1) parallelly, and 3) long code #k with the maximum output of 31 is identified. That is, the long code of the base station to which the mobile object belongs is identified as long code #k.

As shown in FIG. 4 (3), spread code controller 33 gives each long code used in the system (long codes #1 to #N) to n number of 61 which is set in each correlator 28-1 to 28-n so as to generate spread codes. The output of 25 is input to 27 through selecting circuit 26, and 27 controls 61 which is set in each of 28-1 to 28-n to generate spread code synchronous to the detected long code timing T. In this way, using 28-1 to 28-n, the correlation is parallelly carried out between received spectrum spread signal and the long code prepared in the system. When this long code is identified, 50-S is at rest.

The correlated outputs including I- and Q-components from 28-1 to 28-n are input to electric power calculators 29-1 to 29-n, respectively, where their absolute values are calculated, and the absolute values are sent to long code synchronization judgment means 31. FIG. 4 (3) shows exemplary outputs of 29-1 to 29-n, in which the output 29-k has the correlation peak. Judgment means 31 judges whether each input has a peak exceeding the threshold, and outputs the judgment result and the peak value itself exceeding the threshold to spread code controller 33. Through this, in 33, the long code with the maximum correlation is decided when a plurality of peak values exceed the threshold. In the example shown, long code #k is identified.

As the long code can be parallelly identified using n number of correlators, more rapid processing is possible than in conventional systems.

When the N number of long codes used in the system is larger than n which is the number of correlator 28, each n number of their correlations must be parallelly and sequentially performed.

Not only correlators 28-1 to 28-n but also 22 may be used to identify the long code. Under this execution, more rapid long code identification is possible. When the long code is identified using 22, it should be divided into the short code length to sequentially detect the phase by every symbol.

(Receiving Processing)

Here, the initial cell search is completed, and the normal receiving processing is performed using long code #k identified at S12. That is, at step S13, 33 controls 21 to generate spread code sequence long code #k+short code #j including the identified long code #k and short code #j adopted for communications, so as to calculate in 22 the correlation between the spread code sequence and the received spread spectrum.

Although ideally, the output of correlation between a received signal and spread code sequence has only one peak, actually, the transmitter signals arrive not only directly to an antenna (direct wave), but also reflected by buildings, the ground, and so on (reflected wave). These signals are received with the delay time according to the transmission route, so a plurality of correlation peaks appears. When signals are received through a plurality of routes, multipath fading is generated by the received signals interfering with one another. Therefore, in this embodiment, signals are received through path-diversity by despreading each path signal in n number of parallel correlators 28-1 to 28-n and performing RAKE processing on the outputs from each despreading means. The correlated output from 22 is input to, 23 to detect its size. Through this electric calculation, the signal is output to 24 recognizing that the receiver has received the spread spectrum modulation signal when a correlation peak output larger than the predetermined value is detected. The output of maximum n-path detector 24 is input to correlator control means 27, which supplies baseband signals Ri and Rf and supply voltage to the correlators in 28-1 to 28-n with the same number of detected paths and the corresponding number of phase offsets so as to start their work. Simultaneously, the phase of spread code sequence generated by the spread code generator in each correlator is controlled according to the corresponding path phase offset. Spread code controller 33 controls the spread code generators in among correlators 28-1 to 28-n with the same number of the detected paths and phase offsets to generate long code #k+short code #j. Consequently, each correlator 28-1 to 28-n parallelly despreads the signals received by the corresponding path. I- and Q-component demodulating data output from 28-1 to 28-n are input to RAKE processing and demodulating means 30, as well as input to 29-1 to 29-n. The received electric power corresponding to each path is calculated in 29-1 to 29-n, and input to 20. The despread data corresponding to each path from 28-1 to 28-n are given RAKE processing by multiplying the predetermined coefficient in 30, and then demodulated into serial data to be output.

In the above embodiment, a plurality of correlators 28-1 to 28-n receive the traffic channel signal from the base station. In a similar way matched filter 22 is also used for receiving the signal. In this sequence the output of 22 is input to 30, the multipath signal included in the output is given the predetermined delay and then multiplied by the predetermined coefficient, and the output undergoes RAKE processing with all other paths from 28-1 to 28-n.

(Peripheral Cell Search)

When mobile object 100 on call moves to another adjacent cell, the call must be continued by changing the communication channel to that of the other cell (handover). To do so, the signal from the base station of the peripheral cell should be received, and the base station with the strongest signal should be searched. The peripheral search is described with reference to FIG. 3 (*b*).

First, at S21, the correlation between short code #0 used as the control channel in each cell and the received spread spectrum is calculated in 22. Then, the correlated output is detected from 23 according to the strength of the control signal from each base station shown in FIG. 4 (2). From this output in a process like that above, long code timing of the base station with the strongest signal can be obtained by long code timing detector 25: the exception is the base station under communication.

At S22, the long code is identified so as to identify the base station with the strongest signal excepting that under communication. As 28-1 to 28-n are used for communication with the base station whose channel is connected, the processing at S22 is executed using 22. That is, since the adjacent cell information is already sent from the base station under communication, the long codes of the candidate cells are sequentially generated in 21, and the long code with the strongest correlated output is detected in 32 to decide it is the long code through handover. Here, this long code is supposed to be long code #m. Differing from the initial cell search in parallel above, this peripheral cell search can be rapidly carried out by sequentially switching long code, because 22 can rapidly output the correlated output, and the candidate long code is known beforehand.

Although the long code is designated using 22 in this embodiment, similar but in reverse order to the initial cell search above, it can also be designated parallelly using 28-1 to 28-n, and the traffic channel signal from the connected base station can be received using 22. In this case, the output from 22 is supplied to 30 and the traffic channel is received by the RAKE system.

When the number of paths for usual receiving is smaller than n (number of correlators), the correlator among the n number of ones not used for the communication with the cell presently can be used for the peripheral cell search. Here, the long code designation of the adjacent cell can be carried out using both 22 and the correlators.

The base station identified through handover at S22 outputs a communication signal identical with the base station presently connected to the mobile object through the control station or such portion not shown, using the communication channel.

The mobile object receives the signal from the base station through handover, using 22 at S23. That is, it receives the signal by generating in 21 long code #m of the identified cell through handover and short code #j of the communication channel. This means that the signal from the base station connected beforehand is received using 28-1 to 28-n; simultaneously, the signal from the base station through handover is received using 22. Here, as the output of 22 is also input to 30, the outputs from 28-1 to 28-n and that from 22 can be RAKE-processed in 30. Signals from the plurality of base stations can be received through RAKE processing.

At this processing, the phase offset is detected in 24 according to the output of 23, corresponding to the path of the signal from the base station of the cell through handover.

At S24, the spread code "long code #m"+"short code #j" which corresponds to the communication channel through handover is set in 28-1 to 28-n, the correlators function with the timing corresponding to the path detected in 24, and signals are received normally, as at S14. In this way, handover is completed by receiving signals from a plurality of base stations at the same time.

Also, when the long code through handover is identified using 28-1 to 28-n, or when it is identified using 22 and a plurality of correlators not used for receiving signals from the base station presently connected, RAKE processing can be performed, and the handover for receiving signals from a plurality of base stations can be realized.

(Another Embodiment)

Figure 5:
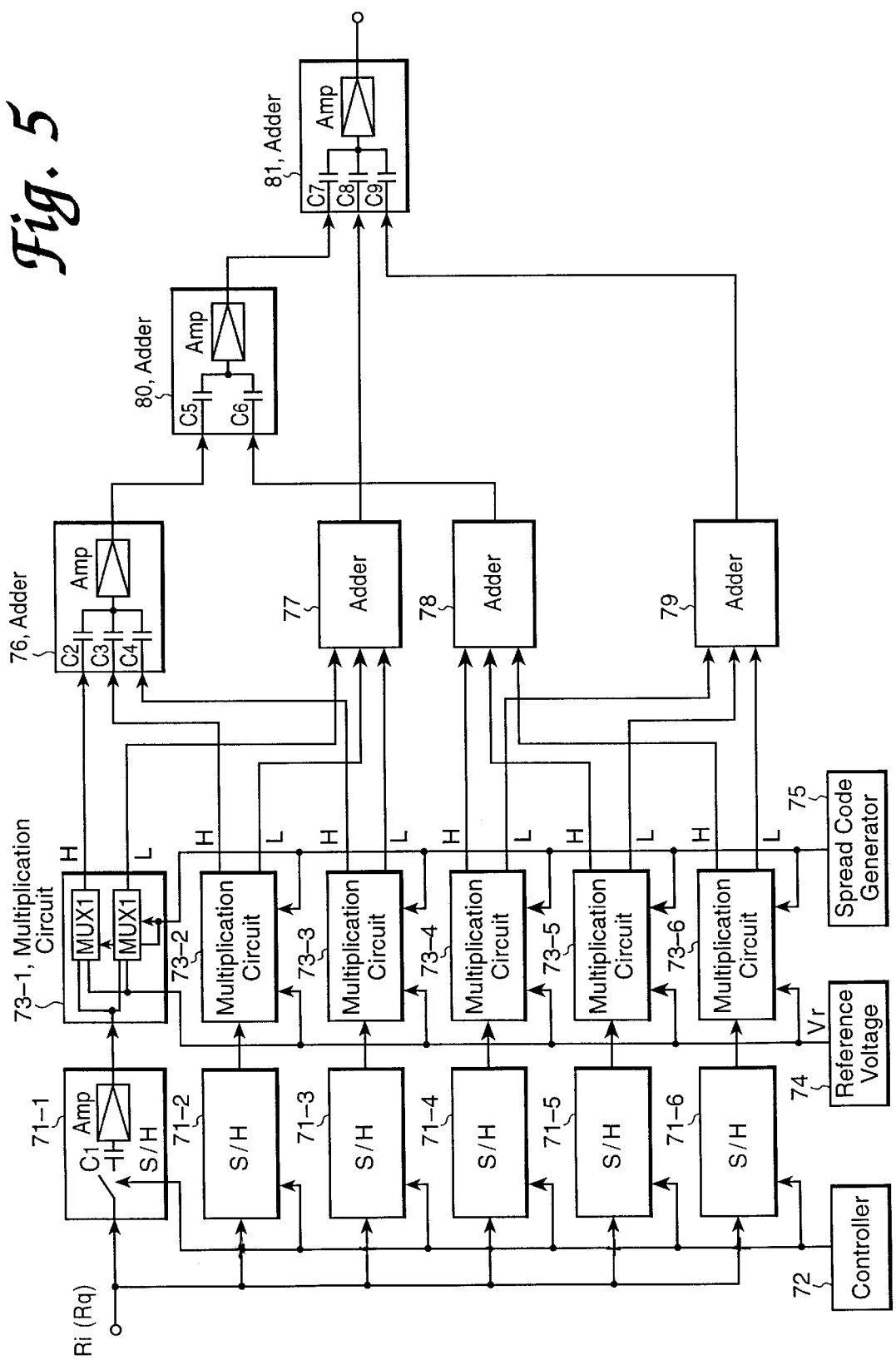
FIG. 5 shows a block diagram of an exemplary structure of the matched filter in another embodiment of the present invention.

Another embodiment with low electric power consumption is described here: it reduces power use by using a matched filter with low electric power consumption. FIG. 5 shows the configuration of the matched filter. This matched filter is one of two which are set in complex matched filter 22 with the same configuration. Although the spread code sequence in FIG. 5 is supposed to be six-bit and contain six delay stages to simplify the structure, the spread code sequence actually used runs from a couple of ten-bit to hundreds bits. Therefore, the matched filter is needed to form stages corresponding to this sequence.

In FIG. 5, 71-1 to 71-6 are sampling and holding circuits for sampling and holding received signals Ri and Rq, 73-1 to 73-6 are multiplication circuits for multiplying outputs of 71-1 to 71-6 and spread codes, 76 to 81 are adders for adding each output of 73-1 to 73-6, 72 is a controller for controlling the sampling timings in 71-1 to 71-6, 74 is the reference voltage generating circuit for inputting the reference voltage to 73-1 to 73-6, and 75 is a spread code generator for generating spread code sequences.

As shown, each sampling and holding circuit 71-1 to 71-6 includes an analog switch controlled by the control signal from controller 72, capacitance C1 and inverting amplifier Amp. Each adder 76 to 81 includes capacitances connecting a plurality of input terminals and an Amp. In this matched filter, the sampling and holding circuits and the adders use analog operating circuits (neural operational amplifiers) containing capacitances connected at their inputs and inverting amplifiers.

Figure 6A:
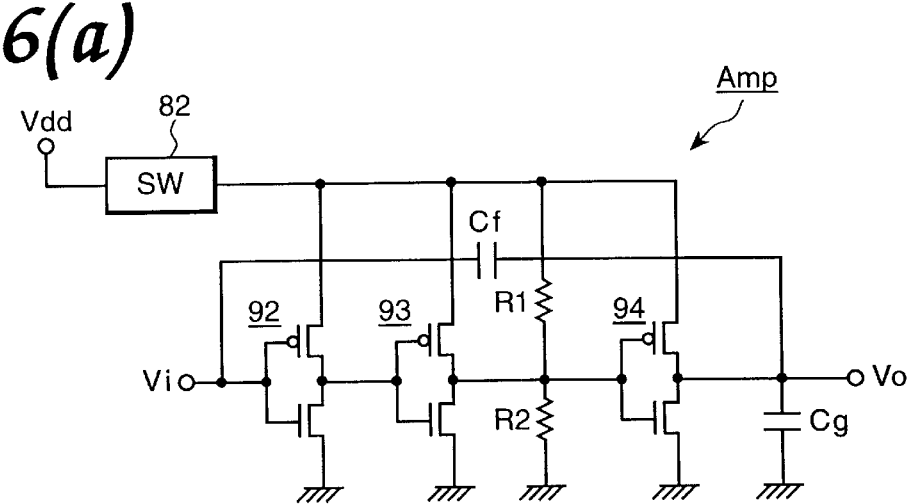
FIGS. 6(a), 6(b) & 6(c) show the configuration of the matched filter in FIG. 5.
Figure 6B:
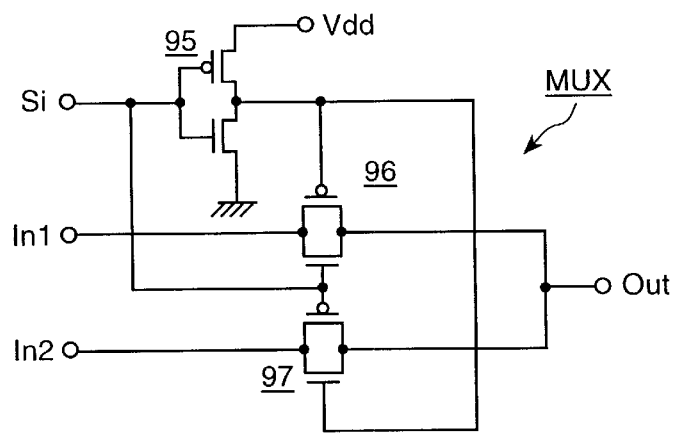
Figure 6C:
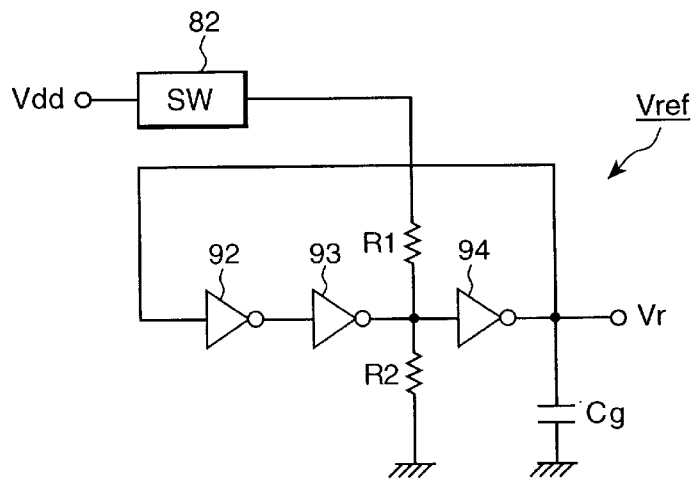

FIG. 6 (*a*) shows the structure of Amp. In FIG. 6 (*a*), 82 is the switch serially connected between supply voltage Vdd and Amp, which is controlled by supply voltage controller 20 described above. Vi is an input terminal, Vo is an output terminal, and feedback capacitance Cf is set between the terminals. Portions 92, 93 and 94 are CMOS inverter circuits, which employ inverters as amplifiers by utilizing the transient part of the CMOS inverter output from high-level to low-level or from low-level to high-level. These circuits are structured by CMOS inverters serially connected with an odd number of stages, three such being shown, for instance. Resistances R1 and R2 and capacitance Cg are set so as to control the gain of Amp and to adjust the phase, respectively: that is, they prevent oscillation of Amp.

Figure 7:
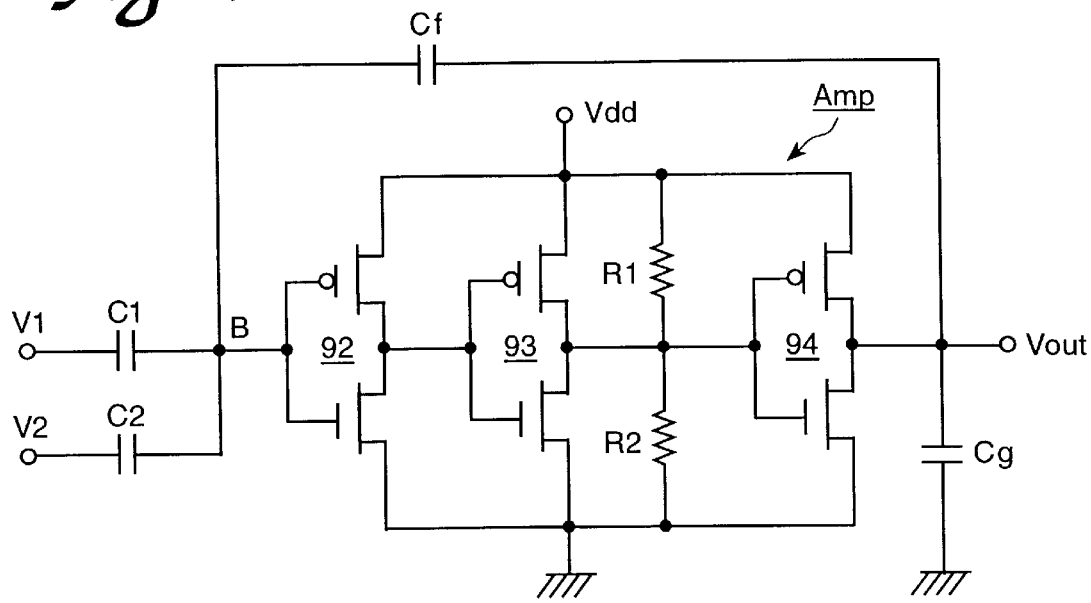
FIG. 7 shows a diagram of the adder action in the matched filter in FIG. 5.
Figure 8:
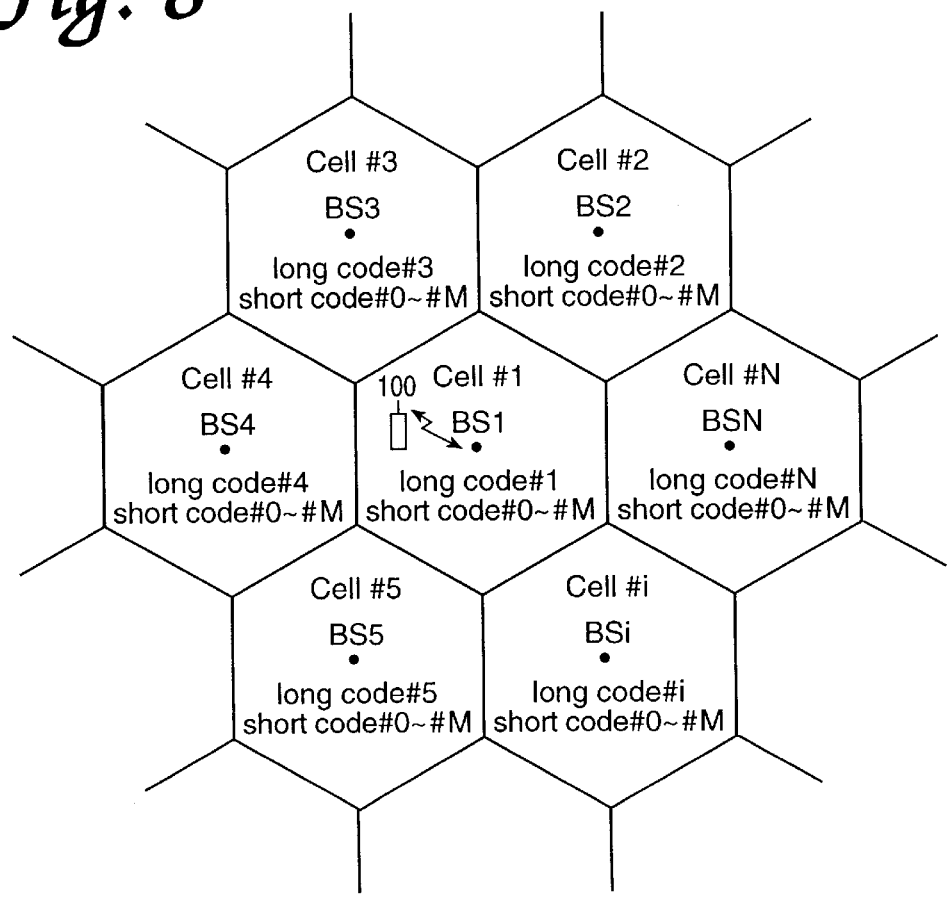
FIG. 8 shows a diagram of an exemplary structure of a cell of asynchronous cellular system.

With reference to FIG. 7, the neural operational amplifier for inputting input voltage to Amp through capacitances is described. In FIG. 7, Amp is an inverting amplifier, to which input voltage V1 and V2 are input through capacitances C1 and C2, respectively. As the voltage amplification ratio of Amp is very large, the voltage at B which is at the input of Amp is approximately constant: this voltage is assumed to be Vb. Here, B is the point connected to the transistor gate configuring C1, C2, Cf and 92, and is floating.

Therefore, at the initial state, supposing that the electrical charge stored in each capacitance is 0, the total charge stored in each capacitance at the reference B is 0, even after V1 and V2 are input. From this, the principle of conservation of charge is exemplified by formula (1):

$$C1(V1-Vb)+C2(V2-Vb)+Cf(Vout-Vb)=0 \quad (1)$$

Replacing V1 and V2 by the voltage with the reference of Vb, which is the voltage at B, and assuming that V(1)=V1−Vb, V(2)=V2−Vb and V'out=Vout−Vb, formula (2) is derived from formula (1):

$$V\text{out}=-\{(C1/Cf)V(1)+(C2/Cf)V(2)\} \quad (2)$$

That is, from the neural operational amplifier, Vout is output with value added after multiplying each Vi by the coefficient Ci/Cf which is the ratio of input capacitance Ci and feedback capacitance Cf, and with inverted polarity.

Sampling and holding circuits 71-1 to 71-6 exhibit the same case as in FIG. 7, which has single input voltage. In those circuits, as the values of C1 and Cf are set equal, the output voltage is −V(1) from formula (2). That is, 71-1 to 71-6 output −Ri (or −Rq) which is voltage with the inverted polarity of input voltage Ri (or Rq) at the point the input switch is opened by 72.

Controller 72 controls transmission of input voltage to 71-1 to 71-6 by sequentially inputting control signals to 71-1 to 71-6, closing analog switches in 71-1 to 71-6 for a time, and sequentially opening switches of 71-1 to 71-6. Consequently, a single cycle of spread code sequences is input to 71-1 to 71-6, and the inverted received signals are output.

Multiplication circuits 73-1 to 73-6 receive outputs from 71-1 to 71-6, respectively, which are structured by two multiplexer circuits MUX1 and MUX2 with identical configurations. FIG. 6 (*b*) shows the structure of multiplexer circuit MUX. In FIG. 6 (*b*), 95 is a CMOS inverter, and 96 and 97 are CMOS transmission gates. Si is a control signal input terminal to which the data is input: it is, among the spread code sequences generated in 75, the data of the bit corresponding to multiplication circuit 73-i in which MUX is included. In1 and In2 are the first and second input terminals, and Out is an output terminal. In this configuration, when Si is 1 (high-level), transmission gate 96 is conductive and 97 is cutoff, consequently, the input signal from In1 is output at Out. Conversely, when Si is 0 (low-level), 96 is cutoff and 97 is conductive, resulting in the input signal from In2 being output at Out.

As described, in each circuit 73-1 to 73-6, the first and second MUXs are set as MUX1 and MUX2. The output of MUX1 is the H-output of 73-i, and the output of MUX2 is the L-output of 73-i. To In1 and In2 of MUX1, output voltage Vi from sampling and holding circuit 71-i, which is the sampling and holding circuit corresponding to the multiplication circuit to which the present MUX1 belongs, and the reference voltage Vr from 74 are input, respectively. On the other hand, to In1 and In2 of MUX2, Vi and Vr are supplied as the input voltage opposite to the way of MUX1. That is, Vr is input to In1, and Vi is input to In2.

Therefore, when Si of the spread code corresponding bit which is supplied to the control terminal is 1, MUX1 outputs the input voltage from 71-i at its output H, and MUX2 outputs Vr from 74 at its output L. When Si is 0, MUX1 outputs Vr at its output H, and MUX2 outputs the input voltage from 71-i at its output L.

FIG. 6 (*c*) shows the configuration of the reference voltage generating circuit (Vref) 74. In FIG. 6 (*c*), 92, 93 and 94 are CMOS inverter circuits like those in Amp in FIG. 6 (*a*), R1 and R2 are resistances for gain control, Cg is a capacitor for phase adjusting. Portion 82 is a switch connected among supply voltage Vdd, each CMOS inverter 92–94 and resistance R1; the conduction of 82 is controlled by supply voltage controller 20. The output voltage of this circuit converges at a stable point where its input and output voltage are equal. This circuit generates the necessary reference voltage Vr by setting the thresholds of CMOS inverters 92–94, and making some additional adjustment, if necessary. Here, it is supposed that Vr=Vdd/2=Vb (Vdd signifies the supply voltage) so that the dynamic range can be enlarged. Therefore, when Vr is output from the H-output or the L-output of 73-1 to 73-6, the input voltage V(i) in formula (2) is 0.

The outputs from MUX1 (H-output) in 73-1 to 73-3 are input to adder 76. In 76, as the size of input capacitances C2, C3 and C4 which correspond to the output voltage from 73-1 to 73-3 are ⅓ that of Cf, the voltage is output with ⅓ the value of the sum of output voltage from 73-1 to 73-3 from formula (2). The polarity of the output voltage is the same as that of input voltage Ri (Rq) of the matched filter.

To adder 78, H-outputs of 73-4 to 73-6 are input. As with adder 76, the voltage with the same value as the sum of theirs is output from 78. The polarity of this voltage is the same as that of Ri (Rq).

The outputs of 76 and 78 are input to adder 80. The values of input capacitances C5 and C6 in 80 are ½ that of Cf. Adder 80 outputs the voltage with the value of the sum of ½ of the outputs from 76 and from 78. This voltage has reversed polarity from that of Ri (Rq).

On the other hand, the outputs from MUX2 (L-output) in 73-1 to 73-3 are input to adder 77, from which the voltage with the same value as the sum of theirs is output, as with adder 78. The L-outputs from 73-4 to 73-6 are input to 79, from which the voltage is output with the same value as the sum of theirs and with the same polarity as that of Ri (Rq).

The outputs of 80, 77 and 79 are input to 81. In 81, the size of input capacitance C7 corresponding to the input from 80 is the same as that of Cf, and the sizes of input capacitances C8 and C9 corresponding to the input from 77 and 79, respectively, are Cf/2. Therefore, 81 outputs the voltage with the value of the difference between 80 and the sum of the halves of output voltages 77 and 79. That is, from 81, the difference between the sum of the outputs from 71-1 to 71-6 to which spread code sequence 1 is supplied by 75 and the sum of the outputs to which 0 is supplied is output. This means that the correlation value between spread code sequences is output from 81.

The reason why ½ of the input voltage sum is output from 80 and ½ of the output voltages from 77 and 79 are added is that the maximum voltage does not exceed the supply voltage.

In this matched filter, after the correlation value is output from 81, the spread code sequence output from 75 is shifted by one chip, and the next correlation value is obtained by performing computation similar to that above. Since it is thus unnecessary to shift the signal performed sampling and holding, no errors caused by shifting occur. Acquisition is completed by sequentially shifting spread code sequences.

This matched filter largely reduces the circuit size compared to digital processing because the computation by the neural operational amplifier is analogously executed using capacitive coupling; also, parallelly processing enhances processing speed. Further, very low electric power consumption is realized since all the inputs and outputs are voltage signals.

Although signals through QPSK processing are exemplified in the above embodiment, another modulation system such as BPSK can also accomplish the processing.

The initial acquisition scheme of the present invention completes a rapid initial cell search because it detects long-code timing using a matched filter, and parallel correlators identify the long code with the detected long code timing.

Also, handover can be realized because the long code timing through handover is detected and the long code through it is identified by a matched filter while the peripheral cell search is carried out, the signal from the base station under communication is received by a correlator, and the signal from the base station through handover can be received at the same time.

RAKE receiving performed by parallelly setting a plurality of correlators allows good signal quality even when multipath fading exists.

Moreover, during the initial cell search, handover and communication (multipath receiving), the matched filter and a plurality of correlators can be commonly used, thus realizing higher efficiency and smaller sizes.

Finally, the receiver affords low electric power consumption by using a matched filter in which a neural operational amplifier is set to work.

What is claimed is:

1. An acquisition scheme for an asynchronous DS-CDMA cellular communication system, using spread code sequences having a long code peculiar to each cell and a short code corresponding to each communication channel, and a control channel among said communication channels employing a specified short code common to each cell, with
   (a) two steps for accomplishing the initial cell search:
      (1) detecting a correlation between said specified short code and a received signal, and detecting a long code timing of a relevant base station according to the maximal value of correlated outputs, and
      (2) identifying a long code of said base station through parallel detection of said long code used in the relevant system, by using a plurality of parallel correlators, or using both said plurality of correlators and a matched filter according to said detected long code timing; and
   (b) two steps for accomplishing a peripheral cell search:
      (1) detecting a correlation between said specified short code and received signal, and detecting a long code timing of a relevant base station according to correlated outputs, and
      (2) identifying said long code of said base station through handover by sequentially detecting a correlation with a long code corresponding to a peripheral cell using said matched filter while communication is continued with the present cell by employing said plurality of parallel correlators according to said detected long code timing, or by sequentially detecting a correlation with a long code corresponding to a peripheral cell using said plurality of correlators while communication is continued with the present cell by employing said matched filter.

2. A receiver for an asynchronous DS-CDMA cellular communication system using spread code sequences having a long code peculiar to each cell and a short code corresponding to each communication channel, and employing a specified short code common to each cell in the receiver's control channel, comprising:
   i) a matched filter for detecting a correlation between a received signal and a spread code sequence;
   ii) a plurality of correlators parallelly set for detecting a correlation between said received signal and spread code sequence;
   iii) a long code timing detector for detecting the maximal correlated output of said matched filter;
   iv) a long code synchronization judging means for receiving said correlated output from said matched filter;
   v) a long code synchronization judging means for receiving said correlated output from said plurality of correlators;

vi) a correlator controller for receiving an output of said long code timing detector and for controlling the action of said plurality of correlators; and vii) a spread code controller for receiving an output from said long code synchronization judging means, and for outputting control signals to select a spread code sequence used for correlating action in said matched filter and said plurality of correlators.

3. A receiver for the asynchronous DS-CDMA cellular communication system as claimed in claim 2, wherein said plurality of correlators further comprises a delay-locked loop for performing acquisition of a received spread spectrum signal, said correlator controller controls the action of said plurality of correlators according to the peak location of the correlated output from said matched filter, and the data output from said plurality of correlators and from said matched filter are judged through RAKE processing.

4. A receiver for the asynchronous DS-CDMA cellular communication system as claimed in claim 2, wherein after long code synchronization, a traffic channel signal is received using said matched filter and said plurality of correlators, and multipath signal data are judged after RAKE processing.

5. A receiver for the asynchronous DS-CDMA cellular communication system as claimed in claim 3, wherein after long code synchronization, a traffic channel signal from the base station of the present cell is received using said matched filter and some correlators among said plurality of correlators, RAKE processing is performed, a control channel signal from the base station of a peripheral cell is received using the remaining correlators, the long code of said cell is recognized and synchronized, a data signal the same as that from the base station of the present cell is received, and signals from both base stations or a plurality of base stations are judged.

6. A receiver for the asynchronous DS-CDMA cellular communication system as claimed in claim 3, wherein a multipath signal contained in said matched filter undergoes RAKE processing to communicate with the base station of the present cell using said matched filter, and a long code is divided into the length of a short code to detect the long code corresponding to said present cell or said peripheral cell by said matched filter, and correlations are sequentially detected by every symbol.

7. A receiver for the asynchronous DS-CDMA cellular communication system as claimed in claim 2, wherein said matched filter comprises a plurality of multiplication circuits for outputting the output of a plurality of sampling and holding circuits to the first and second output terminals according to the bit value corresponding to the spread code sequence, a first analog addition circuit for adding the output of the first output terminal of each said multiplication circuit, a second analog addition circuit for adding the output of the second output terminal of each said multiplication circuit, and a third analog addition circuit for calculating the difference between the outputs of said first and second analog addition circuits.

* * * * *